(12) United States Patent
Mehta et al.

(10) Patent No.: US 7,740,928 B2
(45) Date of Patent: Jun. 22, 2010

(54) PEEL AND STICK STRETCH WRAP

(75) Inventors: Vinay Mehta, Bridgewater, NJ (US); Makam S. Chetan, Westford, MA (US); Av Kerkar, Rockaway, NJ (US)

(73) Assignee: Building Materials Investment Corporation, Dallas, TX (US)

( * ) Notice: Subject to any disclaimer, the term of this patent is extended or adjusted under 35 U.S.C. 154(b) by 372 days.

(21) Appl. No.: 11/656,202

(22) Filed: Jan. 22, 2007

(65) Prior Publication Data

US 2008/0173389 A1    Jul. 24, 2008

(51) Int. Cl.
*B32B 9/00* (2006.01)
*B32B 3/02* (2006.01)
*B32B 3/10* (2006.01)

(52) U.S. Cl. ............ 428/40.1; 428/42.1; 428/64.1; 428/66.6; 428/66.5; 428/80; 428/131; 428/134

(58) Field of Classification Search ........ 428/40.1, 428/42.1, 64.1, 66.5, 66.6, 66.7, 66.3, 80, 428/81, 134, 343, 344
See application file for complete search history.

(56) References Cited

U.S. PATENT DOCUMENTS

| | | | |
|---|---|---|---|
| 1,314,107 A | | 8/1919 | Waller |
| 3,655,501 A | * | 4/1972 | Tesch ................. 428/136 |
| 3,897,705 A | | 8/1975 | Filleau et al. |
| 4,068,366 A | | 1/1978 | Hillesheim |
| 4,099,309 A | | 7/1978 | Bender |
| 4,144,624 A | | 3/1979 | Szego et al. |
| 4,263,356 A | | 4/1981 | Nomura et al. |
| 4,803,128 A | | 2/1989 | Bender |
| 4,881,307 A | | 11/1989 | Gaissmaier |
| 5,001,017 A | | 3/1991 | Alhamad et al. |
| 5,407,607 A | | 4/1995 | Mix |
| 5,538,778 A | | 7/1996 | Hurwitz et al. |
| 5,667,871 A | | 9/1997 | Goodrich et al. |
| 5,725,931 A | * | 3/1998 | Landin et al. ............ 428/134 |
| 5,782,735 A | | 7/1998 | Goodrich et al. |
| 5,858,505 A | | 1/1999 | Moen et al. |
| 2005/0227032 A1 | * | 10/2005 | Pemberton ............ 428/40.1 |
| 2005/0260383 A1 | | 11/2005 | Alhamad |
| 2006/0251888 A1 | * | 11/2006 | Lane et al. ............ 428/343 |
| 2007/0122590 A1 | | 5/2007 | Lalvani |

* cited by examiner

*Primary Examiner*—Patricia L Nordmeyer
(74) *Attorney, Agent, or Firm*—William J. Davis; Sills Lummis & Gross P.C.

(57) ABSTRACT

A paper or plastic surface material of appropriate thickness and stiffness which can be coated with or laminated to asphaltic or non-asphaltic adhesives. The surface material can have a plurality of individual slits formed in substantially parallel spaced rows extending transversely from one end to the opposing end of the surface material. The flexible surface material is expandable by extending the opposing ends of the surface material whereby the slits form an array of openings. The length, width and spacing of the cuts can be varied to achieve desired stretch ratios. The surface material can be easily stored in the non-expandable position and easily expanded to be stretchable and conformable around windows, skylights or other suitable uses.

6 Claims, 5 Drawing Sheets

PEEL AND STICK STRETCH WRAP

BACKGROUND OF THE INVENTION

1. Field of the Invention

The present invention relates generally to stretchable and conformable products for building/construction/roofing applications, and more specifically, to peel and stick products having surface film cross slit patterns that allow the films to stretch to conform to windows, skylights or other suitable uses.

2. Prior Art

Generally, the films that are used in the building/construction industry for waterproofing around skylights, windows and other odd shape articles with a non-linear profile include a crepe surface film or paper to seal the borders of the window or skylight. This crepe surface film or paper can be expensive and bulky, and can therefore cost more after transportation charges.

Further, a problem occurs around windows or skylights that have a curved outer surface. The surface film or paper is stretched around the curve and can tear or not cover the surface area evenly. Thus, it is likely that water or moisture will leak through the borders of the windows or skylights. Additionally, by virtue of the very nature of crepe surface, delamination from the compound occurs during its application thereby resulting in reduced protection from weather elements.

Therefore, there is a need in the building/construction industry for a stretchable film or paper that can be applied without tearing to the borders of curved windows or skylights, and which provides a more reliable waterproof seal.

SUMMARY OF THE INVENTION

One embodiment of the present invention provides a stretch wrap or flashing tape for application in the building/construction industry and other suitable industries that stretches and is conformable to the shape of the object to which it is being applied without tearing. Yet another embodiment of the present invention provides an alternative composition (construction) for a stretchable tape having surface film (paper, plastic/polymer, metal foil, laminate, composite, or a hybrid) with slits of different designs, lengths, widths and spacings on the stretch wrap that allows for desired stretch ratios.

Accordingly, a stretch wrap is provided, the stretch wrap comprising a surface material having a length, width and thickness, and one or more slits that extend throughout the thickness of the surface material, wherein the slits allow the surface material to stretch without tearing when the material is extended in a lengthwise or widthwise direction.

The surface material can be comprised of a paper, plastic, metal foil, laminate, composite or a combination of such. The stretch wrap can further comprise a release film attached to an adhesive on a bottom of the surface material. The adhesive can be of any type—hot melt, pressure sensitive, solvent or water-based, thermoplastic, moisture-curable, multi-part reactive, UV resistant, sealants, or a mixture thereof or in distinct layers, etc.

The adhesive can also be, but is not limited to, a SEBS (styrene-ethylene/butylene-styrene) compound, SBS (styrene butadiene styrene) compound, APP modified bituminous compound, butyl rubber compound, single component PVAc (polyvinyl acetate) water-resistant adhesive, water-resistant polyvinyl acetate adhesive, EVA (ethylene vinyl acetate)-hot melt adhesives, pressure sensitive hot melt adhesive atactic polypropylene (APP) base pressure sensitive tapes, polyurethane adhesives, thermoplastic adhesive film based with co-polyamides, thermoplastic adhesive film based with mixed polyolefin and co-polyamide, animal base adhesive, asphaltic base adhesive styrol or verstat acrylate types, and neoprene rubber cementic base adhesive. The adhesive can be UV-resistant or have UV resistance enhancing additives.

The surface material of the stretch wrap can have substantially parallel rows of slits in a machine direction, or substantially parallel rows of slits in a cross-machine direction. The slits in each substantially parallel row can be partially staggered with respect to adjacent parallel rows, or fully staggered.

The surface material can also have substantially parallel rows of slits where each row has a pattern having a slit in a machine direction followed by a slit in a cross-machine direction, followed by a slit in a machine direction.

The surface material can also have substantially parallel rows of slits at an angle with respect to an axis in the machine direction. The angle of the slits can be between 0-90 degrees with respect to the axis in the machine direction, and is preferably approximately 45 degrees. The stretch wrap can also have rows with slits at an angle opposite the adjacent rows with respect to an axis in the machine direction. The slits can also be formed in a non-linear profile.

Further provided is a method of applying a stretch wrap, the method comprising peeling a release film off a bottom side of a surface material thus exposing an adhesive on the bottom side of the surface material, the surface material having a length, width thickness, and one or more slits that extend throughout the thickness of the surface material, and applying the surface material to a border, the surface material being stretchable and conforming to the shape of the border, wherein the slits allow the surface material to stretch without tearing when the surface material is extended in a lengthwise and/or widthwise direction.

The stretchability of the stretch wrap can be determined by a suitable combination of slit length, spacing between the slits, distance between adjacent rows of slits, extent of staggering of adjacent rows, and angle of slits with respect to the machine direction.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Although this invention has numerous and various types of applications for the building/construction industry, it has been found particularly useful in the environment of waterproofing fixtures such as windows, skylights, or any cut-outs in the outer wall or roof of a building, and similar applications. Therefore, without limiting the applicability of the invention to the above, the invention will be described in such environments.

Figure 1:
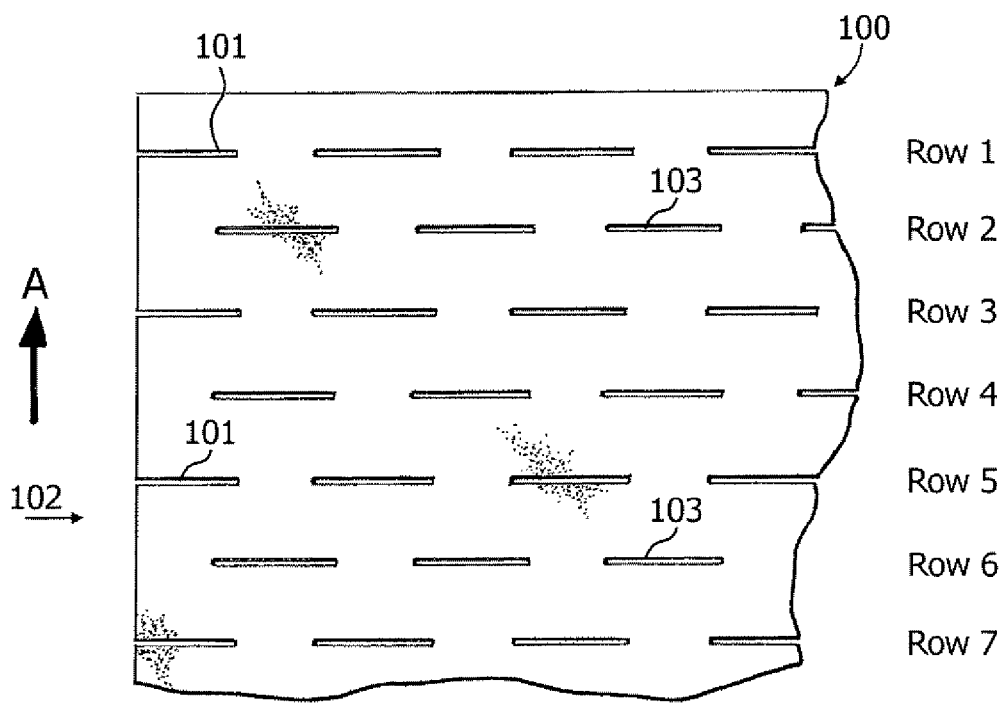
FIG. 1 illustrates a top view of a stretch wrap in accordance with a first embodiment of the present invention.

With reference now to the drawings, the stretch wraps of the present invention will be described. FIG. 1 illustrates one embodiment of a stretch wrap 100 of the present invention. The stretch wrap 100 comprises a surface film that is made of a paper or plastic material. For purposes of illustration, a sample of the stretch wrap 100 is shown in the figure, but is not illustrative of the length, width or thickness of the stretch wrap 100 that may be used for application. In FIG. 1, a top view of a rectangular stretch wrap 100 is provided with its total number of slits in one direction. The term rectangular should be understood to include rectangles in which all four sides are equal, that is, square. The stretch wrap 100 can also be but is not limited to a circular, trapezoidal, or any other shape that may be required.

The surface film can have several substantially parallel rows of slits 101 and 103 in cross-machine direction 102 of the stretch wrap 100. For purposes of illustration, seven substantially parallel rows are shown along a cross-machine direction 102 in FIG. 1. Alternatively (not shown), these slits can be provided in substantially parallel rows along a machine direction A. The slits 101 and 103 extend completely through the thickness of the surface film.

In FIG. 1, the slits 101 and 103 are arranged such that each row has slits 103 along a cross-machine direction that are staggered with respect to the slits 101 in the adjacent rows. Each row can be partially staggered (at least 25% off-set from the center of the slits), or preferably, perfectly staggered (100% off-set at the center of the slits) with respect to the adjacent rows. In other words, rows 1, 3, 5 and 7 have slits 101 in a cross-machine direction. Rows 2, 4 and 6 then have slits 103 in a cross-machine direction that are staggered with respect to rows 1, 3, 5 and 7. Thus, consecutive rows are partially or preferably fully staggered. This configuration will allow maximum stretchability in a cross-machine direction suitable for window walls. Of course the adjacent rows can be partially staggered or fully staggered anywhere between 0-100% and are not limited to the above embodiments.

Figure 2:
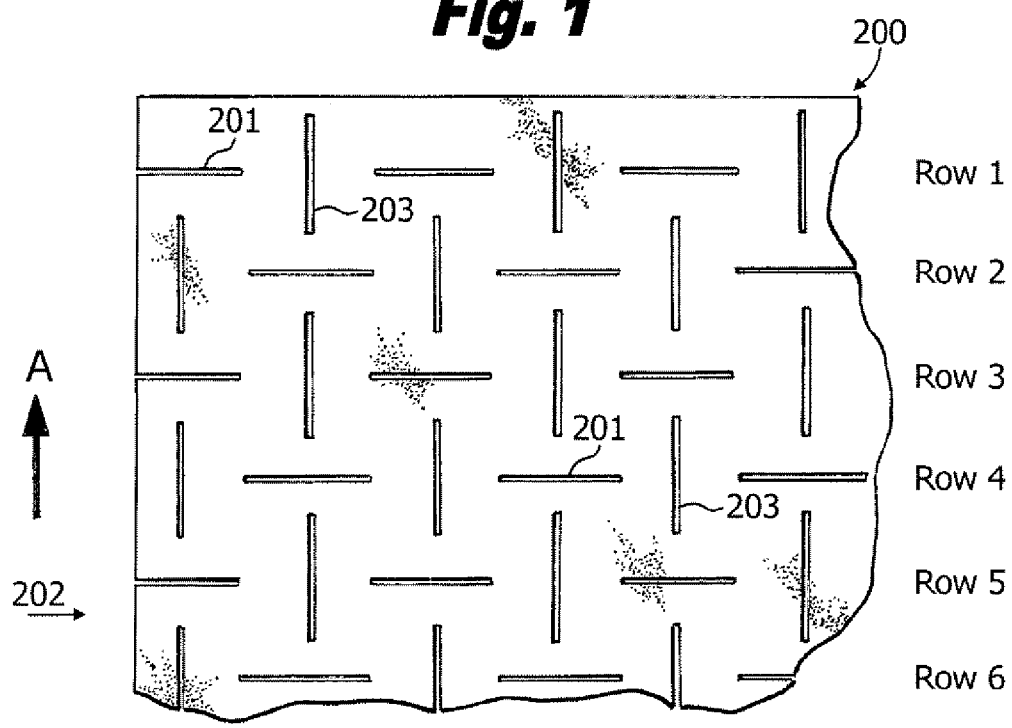
FIG. 2 illustrates a top view of a stretch wrap in accordance with a second embodiment of the present invention.

In another embodiment of the present invention, shown in FIG. 2, each row of slits alternates between a machine direction A and a cross-machine direction 202. Thus, each row has slit 201 in a cross-machine direction 202, followed by a slit 203 in a machine direction A, followed by a slit 201 in a cross-machine direction 202 and so on. Each row can have slits in a direction opposite to the adjacent rows. Therefore, rows 1 and 3 can begin with a slit 201 in a cross-machine direction 202 followed by a slit 203 in a machine direction A, whereas rows 2 and 4 can begin with a slit 203 in a machine direction A followed by a slit 201 in a cross-machine direction 202, as shown in FIG. 2. This configuration will allow stretching in a machine direction and a cross-machine direction as may be necessary.

Figure 3:
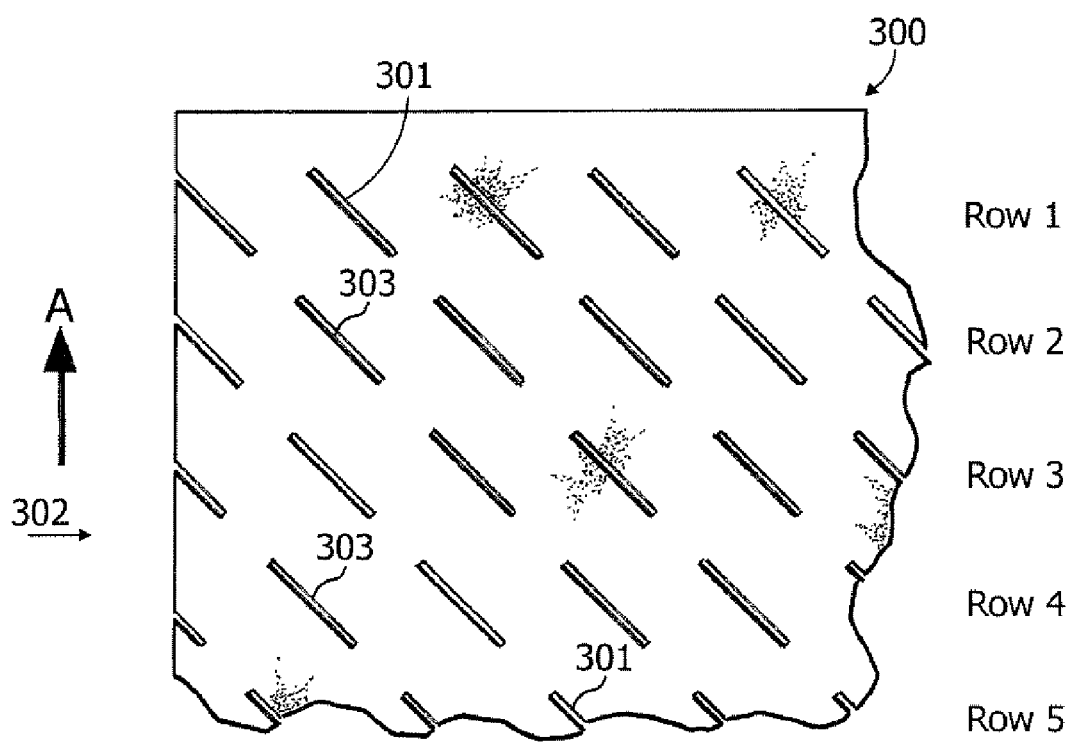
FIG. 3 illustrates a top view of a stretch wrap in accordance with a third embodiment of the present invention.

FIG. 3 shows another embodiment of the present invention in which substantially parallel rows have slits 301 and 303 arranged in a diagonal arrangement at approximately a 45-degree angle with respect to the machine direction A. These substantially parallel rows can be arranged so that the slits 301 and 303 are at a 45-degree angle clockwise or counter-clockwise with respect to the machine direction A imaginary axis. Of course, the angle of the slits 301 and 303 can range from zero to ninety degrees, but is preferably at a 45 degree angle.

Similar to FIG. 1, each row can be partially staggered or preferably, perfectly staggered with respect to the adjacent rows. In other words, rows 1, 3 and 5 have slits 301 at a 45-degree angle with respect to a machine direction A. Rows 2 and 4 then have slits 303 at a 45-degree angle with respect to the machine direction A that are staggered with respect to rows 1, 3 and 5. Thus, consecutive rows are partially, or preferably fully, staggered.

Figure 4:
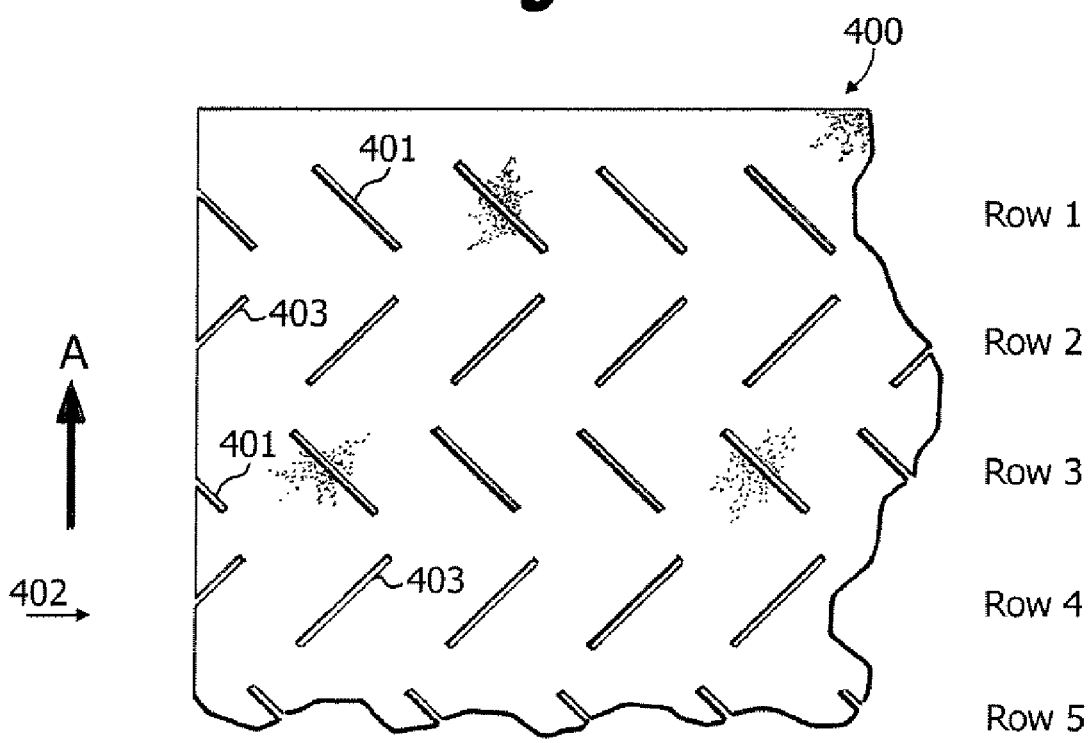
FIG. 4 illustrates a top view of a stretch wrap in accordance with a fourth embodiment of the present invention.

FIG. 4 shows another embodiment of the present invention in which each substantially parallel row has slits 401 arranged at different angles than slits 403 in adjacent substantially parallel rows. Specifically, for purposes of FIG. 4, substantially parallel rows 2 and 4 have slits at a 45-degree angle clockwise from the imaginary axis in the machine direction A, and substantially parallel rows 1 and 3 have slits at a 45-degree angle counter-clockwise from the imaginary axis in the machine direction A. Of course, the angle of the slits 401 and 403 can range from zero to ninety degrees, but are preferably at an approximately 45 degree angle as shown in the figure.

Figure 5A:
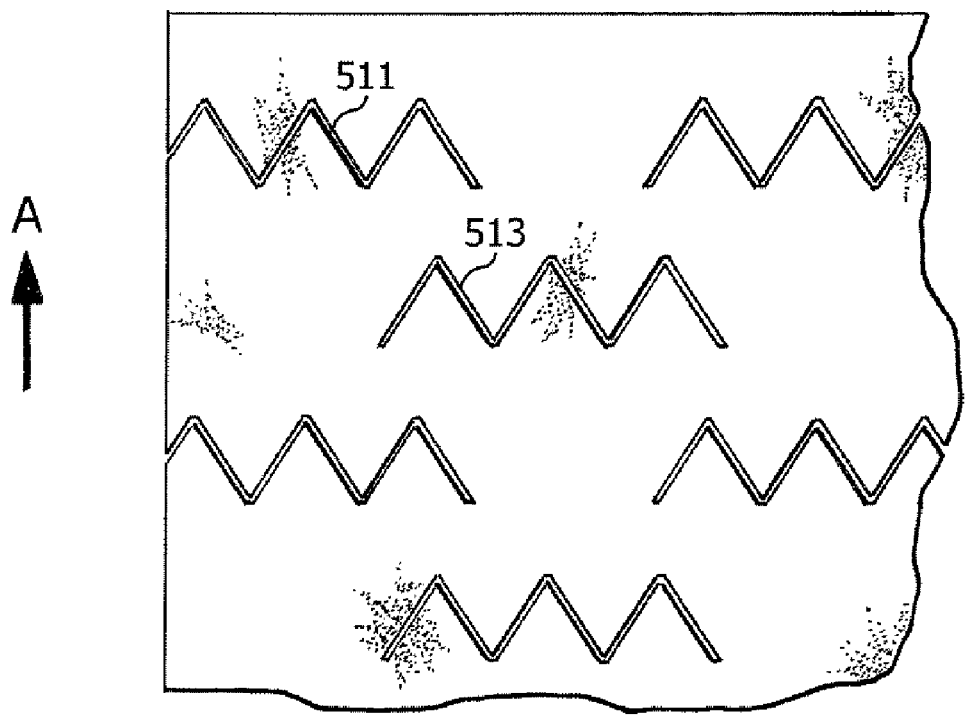
FIGS. 5A and 5B illustrate a top view of a stretch wrap in accordance with a fifth and sixth embodiment of the present invention.
Figure 5B:
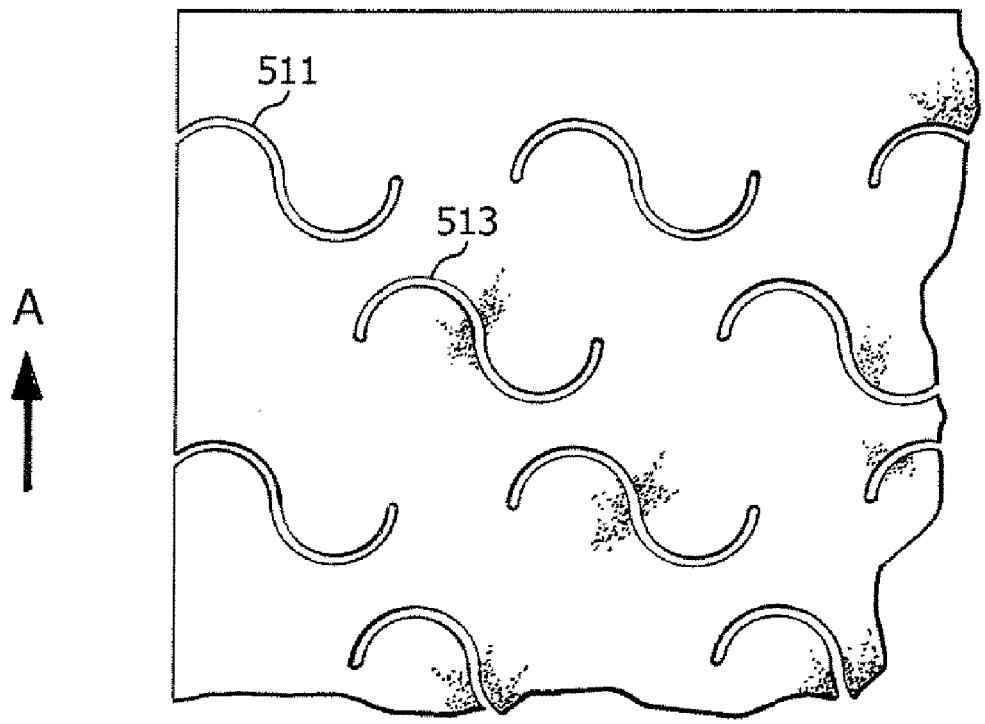

FIGS. 5A and 5B show a fifth and sixth embodiment where slits 511 and 513 are formed in a non-linear slit profile. It will be understood that various modifications and different slits can be used separately on a surface material, or a combination of any of the slits described in the above five embodiments can be used jointly or in combination on one particular surface material.

In all of the six embodiments described above, the slits are formed in the stretch wrap 100 so that the slits extend through the surface film (the top layer of the stretch wrap 100), which can be of a paper or plastic material. Further, the stretch wrap can be of any length, width or thickness, and the number of rows and length or width of the stretch wrap and slits as shown in the figures is just a sample, but can obviously be modified according to the use it is intended for. Some windows, skylights, or chimneys, depending on size, would need a smaller or greater length, width or thickness, and the present invention can be easily modified for such purposes. Further, the stretch wrap can be manufactured to any shape, and is not limited to a rectangular or square shape as shown in the figures. The stretch wrap 100 can be of both a roll form or of small cut sections of any odd shape and size as appropriate for application.

During manufacture, the slit film or paper (stretch wrap 100), would come off a slitting machine. The stretch wrap 100 can be formed on a flat bed slitter and produced directly as a rectangular sheet, as well as on a rotary slitter and cut into individual sheet, or stored directly as a continuous sheet in a roll form.

The stretchable substrate material may also be comprised of a plastic material. The stretch wrap 100 may comprise a LDPE, HDPE, PP, PET, PEN, LLDPE, etc., or a homopolymer or copolymer or any suitable blend of polymeric material. In addition, the stretchable substrate material could be a metal foil of suitable gage or a laminate of paper, film and/or metal foil.

In a preferred embodiment of the present invention, the stretch wrap 100 of FIGS. 1-4 is part of a three layer peel-and-stick stretch wrap. The top layer is the surface film as shown and described in FIGS. 1-4 having the slits. The middle layer is an adhesive or compound, such as but not limited to, an asphaltic, modified asphaltic, acrylic, polyurethane, SEBS (styrene-ethylene/butylene-styrene), SBS (styrene butadiene styrene), APP modified bituminous, butyl, or butyl rubber compound, or other waterproofing compounds such as single component PVAc (polyvinyl acetate) water-resistant adhesive, water-resistant polyvinyl acetate adhesive, EVA (ethylene vinyl acetate)-hot melt adhesives, pressure sensitive hot melt adhesive atactic polypropylene (APP) base pressure sensitive tapes, polyurethane adhesives, thermoplastic adhesive film based on co-polyamides, thermoplastic adhesive film based with mixed polyolefin and co-polyamide, animal base adhesive, asphaltic base adhesive styrol or verstat acrylate types, and neoprene rubber cementic base adhesive, or other similar adhesive/compound known to those skilled in the art. The adhesive can also be UV-resistant or have UV resistance enhancing additives. The bottom layer is a release film such as a plastic film or paper. Accordingly, this allows an on-site worker to pull the release film away and apply the stretch wrap, which will be attached to the outside of a skylight, chimney, window or desired cut-out, with the compound/adhesive which is now exposed. The release film can be optional if the surface film has release characteristics on its visible surface side.

Now, a method of application of the stretch wrap of the present invention as illustrated in FIGS. 1-5 will be described. An on-site worker, when needing to waterproof a window, skylight, chimney or for other similar applications, will use a three layer peel and stick stretch wrap of an appropriate length, width, thickness and stiffness as the application requires. The worker peels off the release film, then applies the stretch wrap to the border of the window, skylight or similar apparatus, attaching it by use of the adhesive (middle layer).

Figure 6:
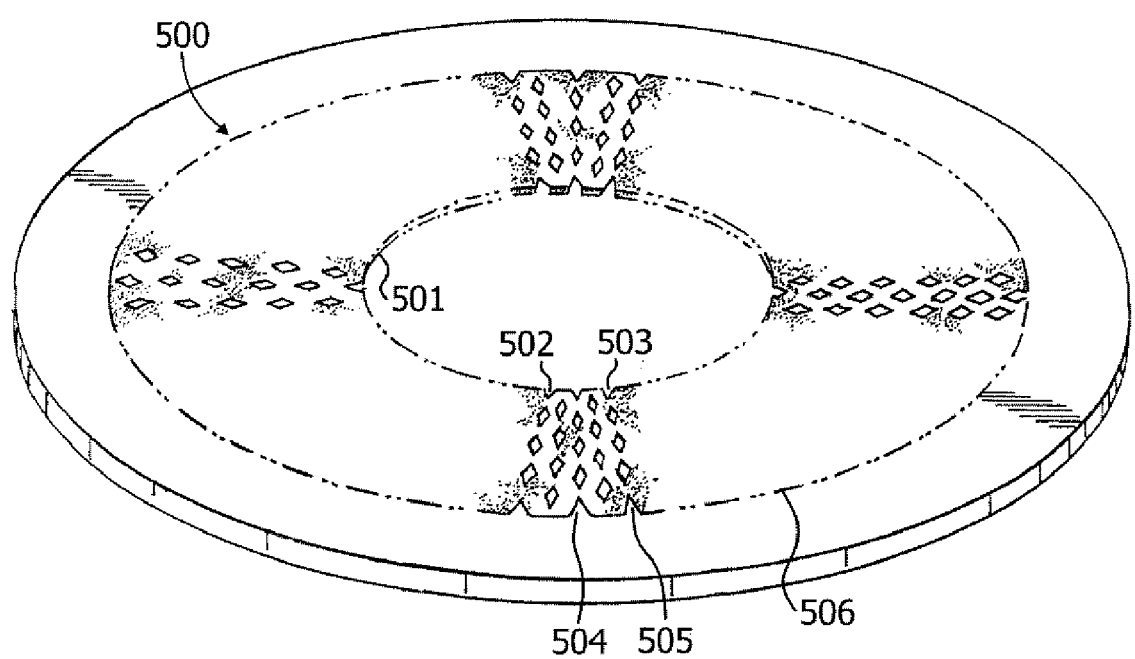
FIG. 6 illustrates a perspective view of the stretch wrap of FIG. 1 after application.

FIG. 6 shows such an application of a peel-and-stick stretch wrap 500 to a border 501 of a circular window. As seen in FIG. 6, the stretch wrap 500 stretches and conforms along the border 501 of the window. Slits 502 and 503 open up to allow stretching of the stretch wrap 500, so the stretch wrap does not tear during application. As can be seen, slits 502 and 503 along the border 501 stretch less than slits 504 and 505 along an outer border 506. The design of the slits allows the stretch wrap 500 to stretch to different ratios along the inner and outer border, without having the stretch wrap tear.

Figure 7:
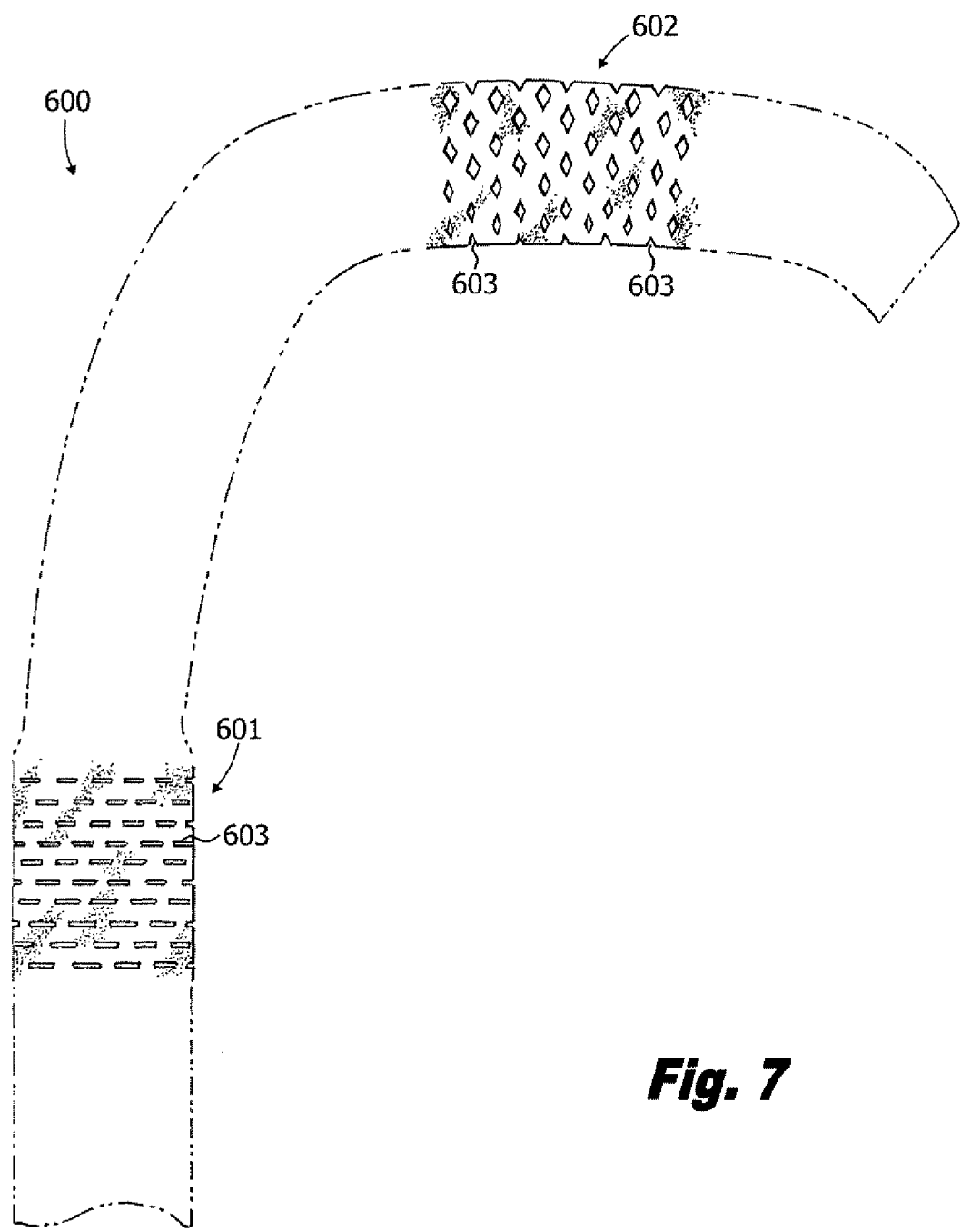
FIG. 7 illustrates another perspective view of the stretch wrap of FIG. 1 after a different application from that illustrated in FIG. 6.

FIG. 7 shows another application of the stretch wrap 600. Here, the stretch wrap 600 can have a straight portion 601, where the slits 603 are barely open, and a curved portion 602, where the slits 603 are widely open. Such a design of the stretch wrap 600 allows the same stretch wrap to be used for circular applications, such as in FIG. 6, and for windows and doorways that have straight and circular portions, such as in FIG. 7. Of course it will be understood that the same stretch wrap can be used for square or rectangular shaped doorways, windows, skylights, etc., or any other shapes.

The stretch wraps may be of any suitable length, width, thickness and stiffness as desired. It will be appreciated that the length and width of each sheet may be as long and wide as desired subject to manufacturing constraints. Moreover, it will be appreciated that it is a feature of the present invention that any type of adhesive or compound may be used to secure the stretch wrap to the release film. The release film can be made of paper or plastic, or other type of similar material used in construction applications.

The present invention can be used as window wrap, for waterproofing applications, and other suitable uses. The slit patterns shown in FIGS. 1-5 can be used, and different modifications of these embodiments can be used (such as length and width of the cuts, spacing of the cuts, etc.) to achieve the desired stretch ratios for the end products. Further, slight modifications can be made in the design of the embodiments shown in FIGS. 1-5, as would be obvious to one of ordinary skill in the art, to achieve the desired stretch wrap for the intended use. For example, the stretchability of the stretch wrap can be determined by a suitable combination of slit length, spacing between the slits, distance between adjacent rows of slits, extent of staggering of adjacent rows, and angle of slits with respect to the machine direction.

The above description of the present invention are only the preferred embodiment of the invention. Embodiments may include any currently or hereafter-known versions of the elements described herein. Different adhesives may be used between the stretch wrap and release film, different lengths, widths, thickness and stiffness of the stretch wraps may be used, and different lengths, widths and spacing of the slits may be used.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A non-tear stretch wrap for applying to a border of a circular opening consisting of:
   a film having a top surface, a bottom surface, a circular outer border and a circular inner border, the circular inner border forming an opening in a center of the film;
   at least three groups of slits being separated by a solid surface, each group of slits having two or more rows of slits being located adjacent to each other, each row of slits including three or more slits, each row extending from the outer border to the inner border, each slit extending from the top surface to the bottom surface;
   an adhesive layer attached to the bottom surface of the film; and
   a release film adhered to the adhesive layer, the release film protecting the adhesive layer before usage,
   wherein, when the stretch wrap is applied to the circular opening, the stretch wrap conforms along the border of the circular opening in such a way that the slits closer to the inner border stretch at different ratios than the slits near the outer border.

2. The stretch wrap of claim 1 wherein the rows are staggered from each other by at least 25% -100%.

3. The stretch wrap of claim 1 wherein the film is a material comprised of a paper, plastic, metal foil, laminate, composite or a combination of such.

4. The stretch wrap of claim 1 wherein the adhesive layer is one of a SEBS compound, SBS compound, APP modified bituminous compound, butyl rubber compound, single component PVAc (polyvinyl acetate) water-resistant adhesive, water-resistant polyvinyl acetate adhesive, EVA (ethylene vinyl acetate)-hot melt adhesives, pressure sensitive hot melt adhesive atactic polypropylene (APP) base pressure sensitive tapes, polyurethane adhesives, thermoplastic adhesive film based with co-polyamides, thermoplastic adhesive film based with mixed polyolefin and co-polyamide, animal base adhesive, asphaltic base adhesive styrol or verstat acrylate types, neoprene rubber cementic base adhesive and combinations thereof.

5. The stretch wrap of claim 1 wherein the adhesive layer is UV-resistant.

6. The stretch wrap of claim 1 wherein the adhesive layer has UV resistance enhancing additives.

* * * * *